UNITED STATES PATENT OFFICE.

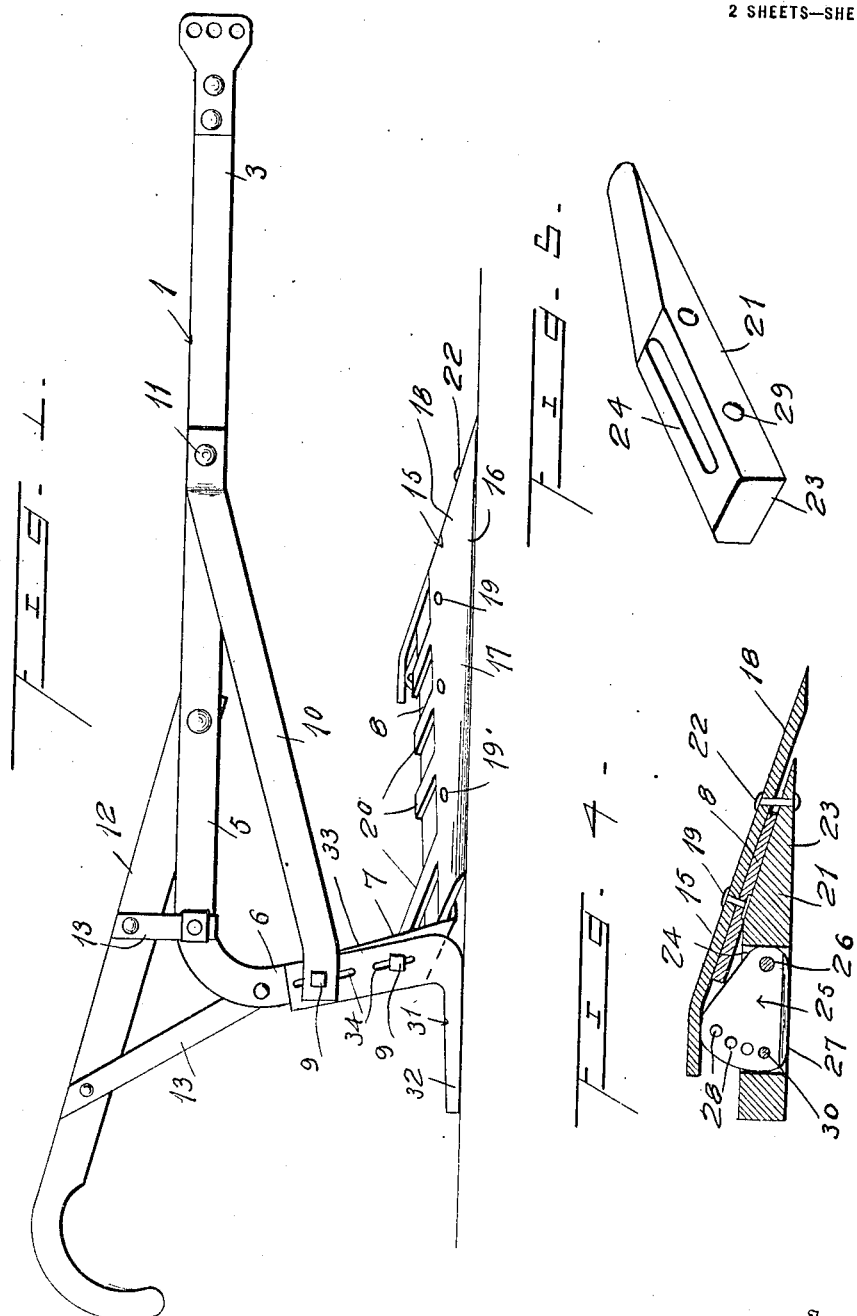

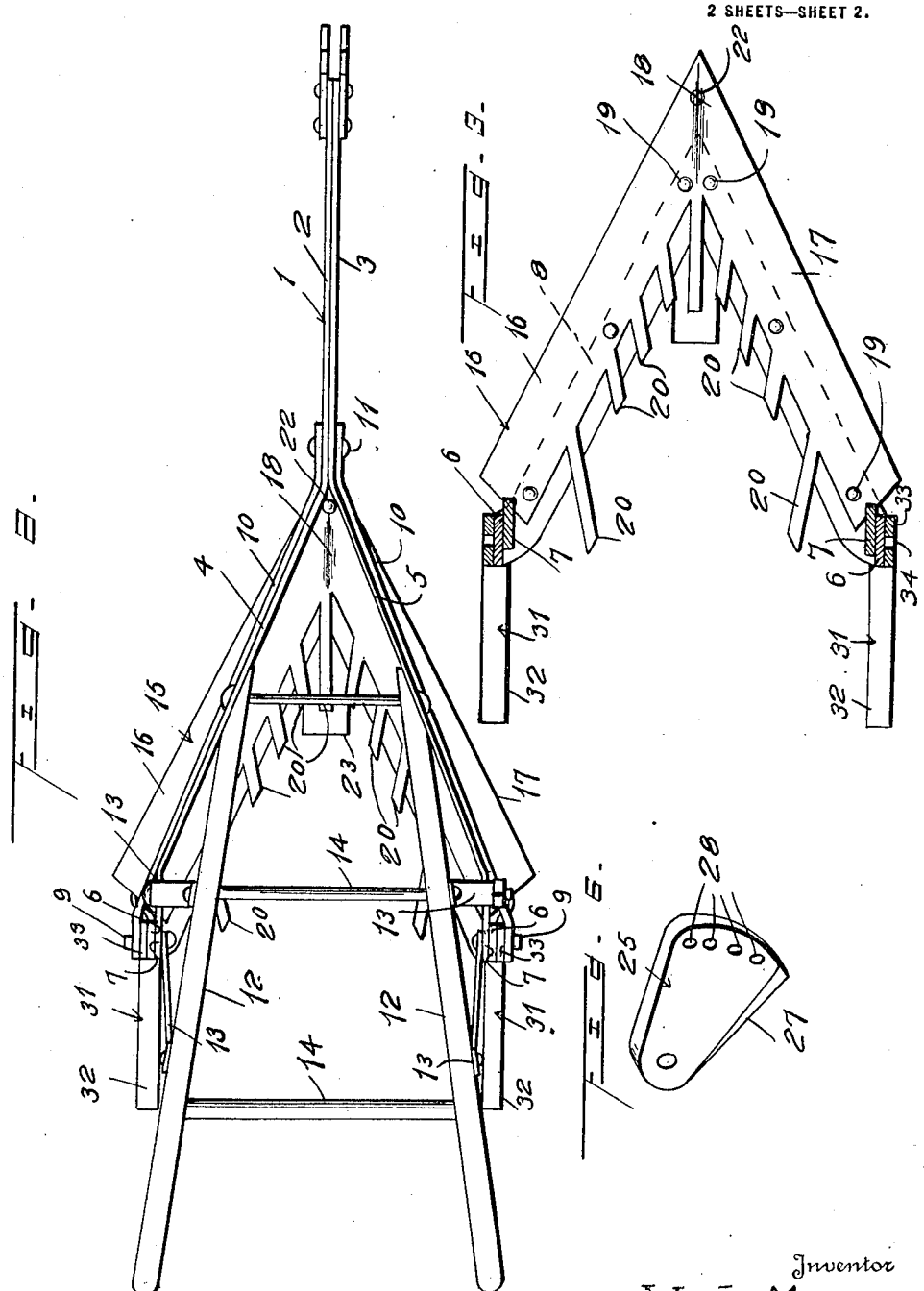

WILLIAM J. MORRIS AND LEVI E. MORRELL, OF ELBA, ALABAMA.

PLOW.

1,261,591. Specification of Letters Patent. Patented Apr. 2, 1918.

Application filed November 23, 1917. Serial No. 203,564.

*To all whom it may concern:*

Be it known that we, WILLIAM J. MORRIS and LEVI E. MORRELL, citizens of the United States, residing at Elba, in the county of Coffee and State of Alabama, have invented certain new and useful Improvements in Plows; and I do hereby declare the following to be a full, clear, and exact description of the invention, such as will enable others skilled in the art to which it appertains to make and use the same.

This invention relates to plows and more particularly to a plow which is designed for harvesting or uprooting peanuts, or analogous crops and the primary object of the invention is to provide a plow structure of this nature which is relatively simple in construction and provides for adjustment to regulate the depth of insertion of the plow into the ground and one which also includes a plurality of rearwardly extending spaced fingers formed upon the rear edge of the plow blades, which fingers assist in separating dirt from the plants uprooted.

A further object of this invention is to provide a plow blade which is substantially V-shaped and has a guiding structure attached to the under surface of the center of the same which guiding structure comprises a suitable supporting bar having its under surface flat which supporting bar pivotally carries a sharpened member, which may be held in various adjusted positions for regulating the distance it projects beneath the lowermost portion of the plow blades and beneath the under surface of its supporting member.

A further object of this invention is to provide a plow structure as specified which includes a frog for supporting the plow blades, the rear ends of which frog are bent upwardly and attached to the downwardly bent rear ends of a forked beam structure.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings, wherein like characters designate like and corresponding parts throughout the several views, and in which:

Figure 1 is a side elevation of the improved plow.

Fig. 2 is a top plan view of the improved plow.

Fig. 3 is a fragmentary horizontal section through the plow.

Fig. 4 is a fragmentary vertical section through the plow showing the guiding member in section.

Fig. 5 is a detail perspective view of the supporting member of the guiding member.

Fig. 6 is a detail perspective view of the pivoted member carried by the supporting member of the guide.

Referring more particularly to the drawings, 1 designates the beam structure of the plow as an entirety, which beam structure is preferably constructed of a pair of bars 2 and 3 which have their forward ends lying in facial abutment with each other. The bars 2 and 3 of which the beam 1 is formed are bent so that their rear portions 4 and 5 diverge as they extend rearwardly, as clearly shown in Fig. 2 of the drawings, so as to provide a pair of spaced arms, the rear ends of which are bent downwardly to provide shanks 6. The shanks 6 have the upwardly bent portions 7 of the rear ends of the frogs 8 attached thereto by means of bolts 9. The frog 8 is constructed of flat metal and is substantially V shaped, terminating in a point forwardly of the shank 6 and directly beneath the beam 1.

The shanks 6 are braced by suitable braces 10 which are attached to the shanks of the upturned ends 7 by the uppermost of the bolts 9 and to the beam 1, a short distance forwardly of the point of diversion of the bars 2 and 3, by a suitable bolt 11 which bolts serve to hold the bars 2 and 3 in firm abutting engagement immediately in front of the point of diversion. The ordinary type of plow handles 12 are attached to the forked arms 4 and 5 of the beam 1 and are braced by suitable braces 13, which are connected to the arms and by suitable cross braces 14 of the usual construction.

A plow blade generically indicated by the numeral 15 is attached to the upper surface of the frog 8 and this plow blade is substantially V-shaped in plan having its shares 16 and 17 angled downwardly and outwardly from their inner short edges as shown in Fig. 1 of the drawings. The point 18 of the plow blade also angles downwardly for insertion into the ground. The blade 15 is attached to the frog 8 by suitable rivets 19. A plurality of rearwardly extending base fingers 20 are formed upon the inner short edges of the wings 16 and 17 of the plow blade 15 and they are provided for assisting in separating dirt from the plants uprooted by the plows.

A block 21 is attached, by means of suitable bolts 22 to the under surface of the frog 8 at the point of the same and it extends between the forward pointed end 18 of the blade 15. The block 21 has its under surface 23 perfectly flat for travel over the ground, and it is provided with a longitudinally extending slot 24 in which is pivotally mounted a guiding member 25. The guiding member 25 is pivotally connected, by means of a pin 26 to the block 21 and it has its lower ground engaging edge 27 sharpened for cutting into the ground. The member 25 is shaped to form substantially a sector of a circle and it is provided with a plurality of spaced openings 28 extending therethrough near its outer rear edge. Any one of the openings 28 and alining openings 29 formed in the block 21 are adapted to receive a pin as indicated at 30 in Fig. 4 of the drawings for holding the member 25 in various adjusted positions to regulate the portion thereof which projects beneath the under surface of the block 21.

A pair of depth regulating runners 31 are attached by means of the bolts 9 to the upstanding end 7 of the frog structure and these runner structures comprise horizontal portions 32 which ride over the ground and consequently regulate the depth of insertion of the plow into the ground. The upstanding portions 33 of the runners 31 are provided with slots 34, through which the bolts 9 extend, so as to permit of the adjustment of the elevation of the horizontal portions 32 of the runners as made necessary or as desired.

In reducing the invention to practice, certain minor features of construction, combination and arrangement of parts may necessitate alterations to which the patentee is entitled provided such alterations are comprehended within the scope of what is claimed.

What is claimed is:—

1. In a plow structure, the combination of a beam constructed of a pair of bars lying in facial abutment throughout the length of the beam and having their rear ends diverging and bent downwardly to form shanks, a frog structure, the inner ends of said frog bent upwardly and engaging said shanks, and a plow blade carried by said frog.

2. In a plow structure, a plow beam composed of a pair of bars having their front portions lying in facial abutment with each other, the rear portions of said bars being diverged to form spaced arms, the rear ends of said spaced arms being down turned to form shanks, a substantially V-shaped frog, the rear ends of the sides of said frog being bent upwardly and attached to said downturned shanks, a plow blade attached to said frog, a plurality of fingers formed upon the rear edge of said plow blade and extending upwardly and rearwardly therefrom.

In testimony whereof we affix our signatures in presence of two witnesses.

WILLIAM J. MORRIS.
LEVI E. MORRELL.

Witnesses:
W. W. SANDERS.
C. E. WILLIAMSON.

Copies of this patent may be obtained for five cents each, by addressing the "Commissioner of Patents, Washington, D. C."